July 15, 1924.

H. D. GEYER

VALVE

Filed Nov. 26, 1920

1,501,592

Witnesses
L. Hale Emrick.
Spencer F. Hunt.

Inventor
Harry D. Geyer.
By Francis D. Hardesty
Attorney

Patented July 15, 1924.

1,501,592

UNITED STATES PATENT OFFICE.

HARVEY D. GEYER, OF DAYTON, OHIO, ASSIGNOR TO DAYTON-WRIGHT COMPANY, OF DAYTON, OHIO, A CORPORATION OF DELAWARE.

VALVE.

Application filed November 26, 1920. Serial No. 426,636.

*To all whom it may concern:*

Be it known that I, HARVEY D. GEYER, a citizen of the United States of America, residing at Dayton, county of Montgomery, and State of Ohio, have invented certain new and useful Improvements in Valves, of which the following is a full, clear, and exact description.

The present invention relates to valves and in its preferred form, which has been chosen for the purpose of description and illustration, relates more particularly to valves for controlling the feed of fuel to internal-combustion engines.

The ordinary plug valves and disk and seat valves are objectionable for the control of fuel, in that they are usually leaky or else fit so tightly as to be difficult to manipulate.

Among the objects of the present invention, therefore, is to prevent leakage and at the same time permit easy manipulation of the valve. Another object is to provide a valve having a free and unrestricted flow of fuel therethrough when the same is open, but permit accurate adjustment thereof when necessary.

Further objects and advantages of the present invention will be apparent from the following description, reference being had to the accompanying drawing wherein a preferred embodiment of the present invention is clearly shown.

Figure 1:
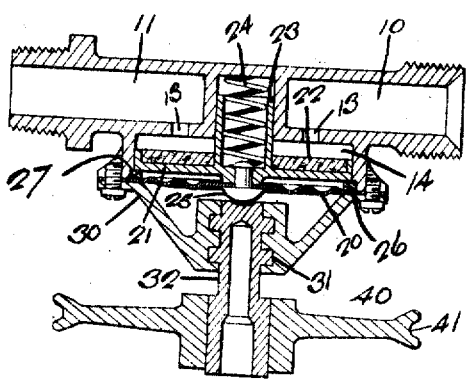
Fig. 1 is a vertical, longitudinal section through the valve.
Figure 4:
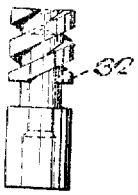
Fig. 4 is a detail showing the threaded operating member.
Figure 5:
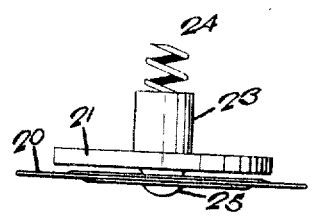
Fig. 5 is a detail showing the assembly of diaphragm, disk and spring.
Figure 2:
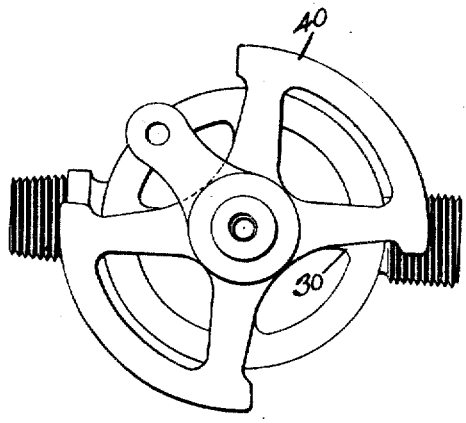
Fig. 2 is a bottom plan view of the same.
Figure 3:
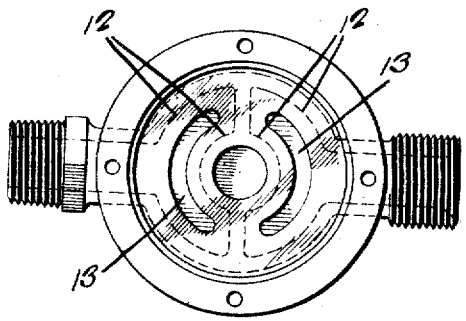
Fig. 3 is also a bottom plan view but with certain parts removed.

Referring more particularly to Fig. 1 the valve comprises an inlet tube 10 and an outlet tube 11, the inner ends of these tubs being enlarged laterally as indicated in F . 3 by the dotted lines 12 and being provided at these enlarged inner portions with arc shaped openings 13 leading into a chamber 14 upon one side of the tubes.

In the preferred form this chamber is circular and is closed at its outer side by means of a diaphragm 20. Attached to the diaphragm at its central point by means of a suitable rivet 25 or other suitable attaching means, is a piston member or disk 21 which is hollowed out on the side opposite the diaphragm to furnish a seat for a suitable packing material 22, the parts 21 and 22 constituting a valve. This disk 21 is also provided at its central portion on its side opposite the diaphragm with a projecting hollow cylindrical portion 23 serving as a guide for the disk and as an abutment for spring 24, which spring and projecting portion 23 operate in a suitable cylindrical depression in the bottom of chamber 14. The walls of this depression serve also as a partition or as part of a partition between the inner ends of tubes 10 and 11.

Attached to the walls of chamber 14 and holding the diaphragm in place is a spider 30. This spider carries at its central portion a threaded opening or passage 31 into and through which passes the cooperating member 32, which is provided at its outer end with means for rotating. This rotating means may be either an ordinary handle such as is provided on the ordinary valve, or it may be provided as indicated in the drawing with a double sector shaped member 40, providing for the operation of the valve by means of cords operating in the grooves 41.

The threaded member 32 is so positioned in the spider 30 as to bear upon the rivet head 25 and when screwed into the spider cause a depression of the diaphragm and its attached disk to close both of the openings 13 into the two tubes.

In order to prevent leakage around the edge of disk 21 and into the space between it and the diaphragm 20, there is preferably provided a suitable annular gasket 26 which is seated between the diaphragm 20 and a small shoulder 27 formed in the outer edge of the chamber wall. The gasket is of such width as to project over and cover the edge of disc 21 when the latter is in the position shown in Fig. 1.

It is thought that operation of the device will be entirely obvious from the foregoing description.

It wi. 'thus be seen that there has been provided a valve which is entirely free from leakage and which will not stick or otherwise become difficult to manipulate.

While the form of mechanism herein shown and described, constitutes a preferred embodiment of the invention, it is to be understood that other forms might be adopted, all coming within the scope of the claims which follow.

What I claim is as follows:

1. A leak proof valve mechanism, including a valve chamber having inlet and outlet openings thereto and a flexible wall, a valve operable within said chamber to open or close said openings on a movement of said flexible wall, means for moving said valve and flexible wall, and means for sealing the valve when at its open position to prevent leakage from said valve chamber independently of the flexible wall.

2. A valve, including a valve chamber having inlet and outlet openings, a valve within said chamber operable to open or close one of said openings, a flexible diaphragm sealing said valve within said chamber to prevent leakage from said chamber, means for operating said valve by moving said diaphragm, and packing means between the wall of the valve chamber and valve when the valve is at its open position to prevent leakage in case the diaphragm should break.

3. A valve, including a valve chamber having a passageway therethrough, a valve within said chamber operable to open or close said passageway, a flexible diaphragm sealing said valve within said chamber to prevent leakage from said chamber, means for operating said valve by moving said diaphragm, and additional means for preventing leakage from said chamber comprising an annular seat upon the wall of the valve chamber upon which the valve rests when in its open position.

In testimony whereof I hereto affix my signature.

HARVEY D. GEYER.

Witnesses.
LEE H. EMRICK,
ALVINA C. LEHMAN.